July 5, 1932.  H. ONKEN  1,865,583
CIRCUIT TESTING INSTRUMENT
Filed Nov 23, 1928
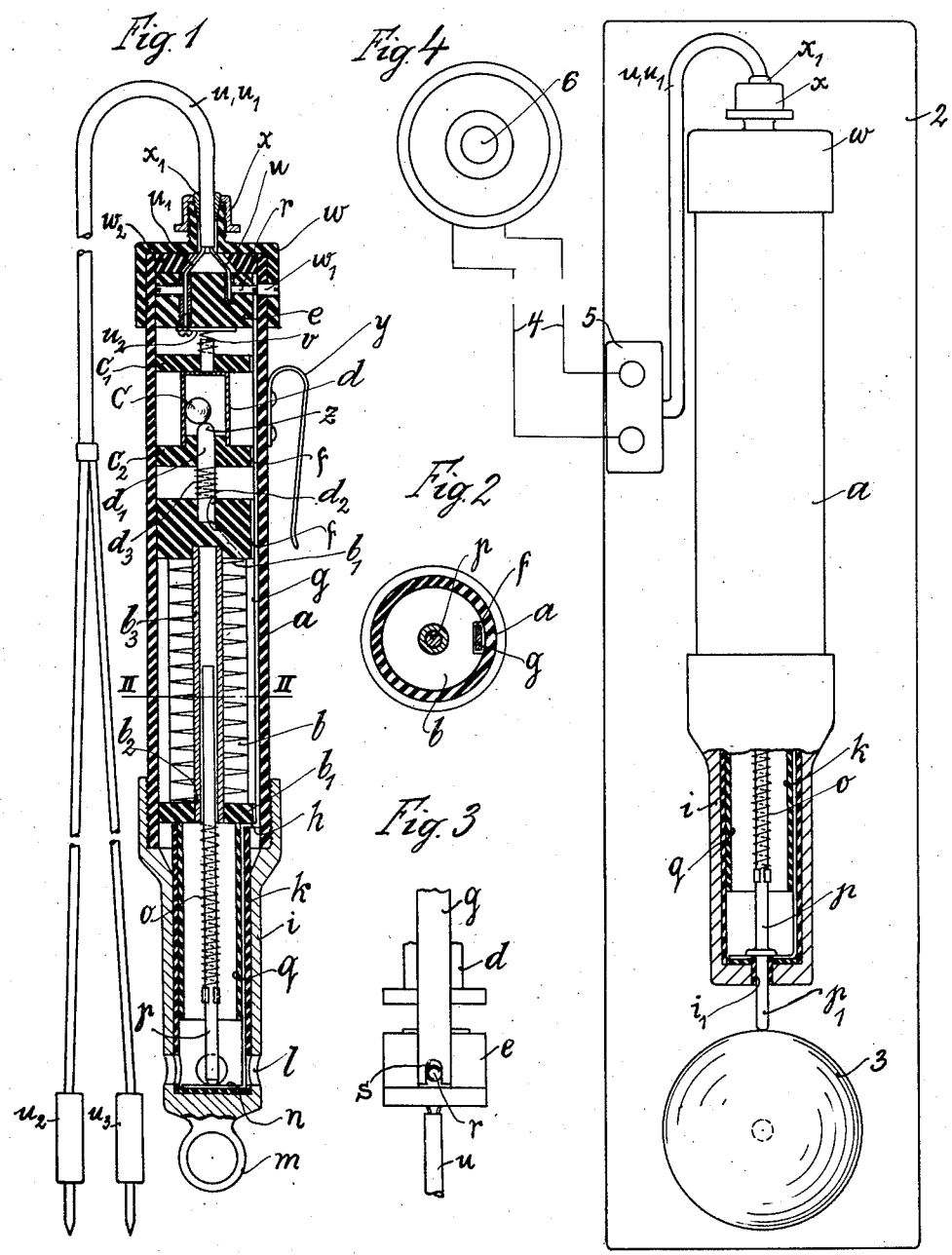
Heinrich Onken
Inventor
by [signature]
his Attorney Patented July 5, 1932

1,865,583

UNITED STATES PATENT OFFICE

HEINRICH ONKEN, OF OLDENBURG, GERMANY

CIRCUIT TESTING INSTRUMENT

Application filed November 23, 1928. Serial No. 321,297.

This invention relates to a current flow testing instrument for electric circuits and lines of that type comprising a magnet coil into which a spring-controlled shiftable contact pin is pulled when the circuit is closed. The circuit closing is effected by a freely movable ball contact which, when the instrument is in the vertical position, touches a contact pin. When the ball contact does not touch the contact pin the circuit in the instrument is interrupted.

According to the invention a contact bar arranged in the direction of the longitudinal axis of the instrument engages with indentations of the magnet coil the contact sleeve and the connection plug and is insulated at the front end from the contact pin and the stopper, by two sleeves of insulation material for instance porcelain.

Another feature of the invention is that an insulated contact pin projects into the contact sleeve the ball slipping off the rounded top end of said contact pin, when the instrument is in vertical position, so that it is securely brought into touch with the contact pin and with the contact sleeve.

The invention may be realized in various manners.

Two embodiments of the invention are illustrated by way of example in the accompanying drawing in which:

Fig. 1 is a longitudinal section showing the testing instrument.

Fig. 2 is a cross section on line II—II of Fig. 1.

Fig. 3 shows in elevation a portion of the contact bar, the outer sleeve being removed.

Fig. 4 illustrates another manner of application of the testing instrument.

The testing instrument consists of an insulating sleeve $a$ in which a coil $b$, a contact sleeve $d$ with contact ball $c$, and a connection plug $e$ are arranged. The contact ball $c$ is of carbon so that the contact points of the sleeve $d$ and of the contact pin $d_1$ projecting into this sleeve are little by little covered with coal-dust whereby a secure contact is ensured. The elements $b$, $d$ and $e$ are prevented from rotating by a narrow contact bar $g$, engaging with indentations $f$ of these elements, the bent off end $h$ of this contact bar $g$ being clamped between a coil disc $b_1$ and a sleeve $k$ of insulation material for instance porcelain held by the screwed on metal cap $i$. This metal cap $i$ has apertures $l$ and a suspension eye $m$ and it covers the spark pole $n$ formed by an angular bent portion of the contact bar $g$ and the contact pin $p$ controlled by a spring $o$ and shiftable in the coil $b$.

The contact bar $g$ is insulated from the contact pin $p$ by a second tightly fitting insulation sleeve $q$ of porcelain or the like, so that the contact bar is protected on both sides by the insulating sleeves $k$ and $q$. The other end of the contact bar $g$ bears against the contact screw $r$ which is clamped in an incision $p$ of the contact bar for circuit closing. The contact screw $r$ is mounted in the connection plug $e$ of the wire $u$, $u_1$. The wire $u_1$ ends in a plate $u_2$ to which the contact sleeve $d$ is connected by means of a spring $v$. The contact sleeve $d$ with the ball $c$ is well insulated by insulating discs $c_1$, $c_2$ one at each end. The contact pin $d_1$, the rounded end of which projects into the contact sleeve, is connected by the wire $d_2$ to the coil winding $b_1$ the other end $b_2$ of which is connected to the inner insulation sleeve $b_3$ in which the contact pin $p$ is shiftably mounted. A spring $d_3$ between coil $b$ and insulating disc $c_2$ serves to securely mount the elements $c_1$, $c_2$.

The sleeve $a$ is closed at the upper end by a cap $w$ secured by a screw $w_1$. Between connection plug $e$ and cap $w$ an insulating disc $w_2$ is inserted. On the cap $w$ a clamping nipple $x$ is screwed, which tightens wedge elements $x_1$ for clamping the cable $u$, $u_1$ and for securing the same against pull and distortion.

As the head $i$ is made of metal it is resistant against breaking. By the construction described all the elements of the testing instrument are securely fixed in the sleeve $a$ as well in longitudinal direction as against rotation.

The operation is as follows:

When the cable $u$, which ends in two terminals $u_2$, $u_3$ is connected to an electric line, by the shifting of contact pin a continual spark is produced when the instrument is held vertically, for instance by suspending it by means of hook $y$ on a garment, and further a loud knocking of the contact pin, which indicates that current is in the line. The circuit is securely closed by ball $c$ touching the contact pin $d_1$ and the contact sleeve $d$ as, the instrument being in vertical or slightly inclined position, the ball $c$ slides along pin $d$ and effects a secure connection between contact sleeve $d$ and contact pin $d_1$. When the instrument is hung up on the eye $m$ the circuit is completely interrupted.

The instrument of the form of construction shown in Fig. 4 includes an electric alarm bell. The contact pin $p$ has an extension $p_1$ projecting through an aperture of cap $i_1$.

The instrument is suspended on a board 2 so that pin $p_1$ is capable of acting as a clapper upon the bell body 3. When the instrument is connected to the line 4 of an electric alarm bell, for instance by plug contact 5, pin $p$ will be continually moved up and down as long as the circuit 4 is closed by a ball contact 6, the pin $p$ striking the bell body 3, so that an alarm is sounded. This type of device is useful to give an audible alarm instead of a spark signal under some conditions.

I claim:

An electric signalling device including an insulating tubular body having a cap at one end, a plug disposed in said body beneath said cap, a terminal on the under face of said plug, a conductor leading from said terminal through said plug and cap, a magnet coil in said body and spaced from said plug, a pair of spaced insulating disks fitted in said body at the ends of said coil, a tubular core for said coil supported by said disks and opening through the lower disk, a second pair of spaced insulating disks fitted in said body to form a chamber between the plug and coil, a contact sleeve fitted axially of the body between the disks of the second pair, a pin extending through the upper disk of the second pair and having conductive connection with said terminal, a contact pin carried by the upper disk of the first pair and extending through the lower disk of the second pair, a contact ball loosely mounted in the sleeve and engageable with the contact pin, a conductive connection between the contact pin and one end of the coil, said coil having its other end connected to the core, an insulating sleeve extending downwardly from the lower of the first pair of disks, a cap surrounding the insulating sleeve, said cap and sleeve having registering sight ports at their lower ends, a contact member extending downwardly from the upper end of the body to the lower end of the sleeve and terminating in a contact terminal, and a contact pin of magnetic material slidable into and out from said core, and a spring normally holding the second contact pin on said last terminal.

HEINRICH ONKEN.